April 12, 1949. E. E. NORDQUIST 2,467,151

FISHING LURE

Filed March 12, 1947

INVENTOR.
Eddie E. Nordquist
BY Victor J. Evans & Co.
ATTORNEYS

Patented Apr. 12, 1949

2,467,151

UNITED STATES PATENT OFFICE 2,467,151

FISHING LURE

Eddie E. Nordquist, Toms River, N. J.

Application March 12, 1947, Serial No. 734,067

1 Claim. (Cl. 43—47)

This invention relates to fishing lure.

It is an object of the present invention to provide a fishing lure which will float on the water surface when not in motion but when being pulled will be drawn downwardly below the surface of the water and which due to its construction will be caused to move first to one side and then the other in a zigzag manner.

It is another object of the present invention to provide a fishing lure which can be given a great variety of maneuvers in accordance with the will of the angler and the manner in which the lure is pulled through the water.

Other objects of the present invention is to provide a fishing lure having the above qualities which is of simple construction, inexpensive to manufacture and which is efficient in operation.

For other objects and for a better understanding of the invention, reference may be had to the following detail description taken in connection with the accompanying drawing, in which Fig. 1 is a side elevational view of the fishing lure embodying the features of the present invention.

Figure 1:
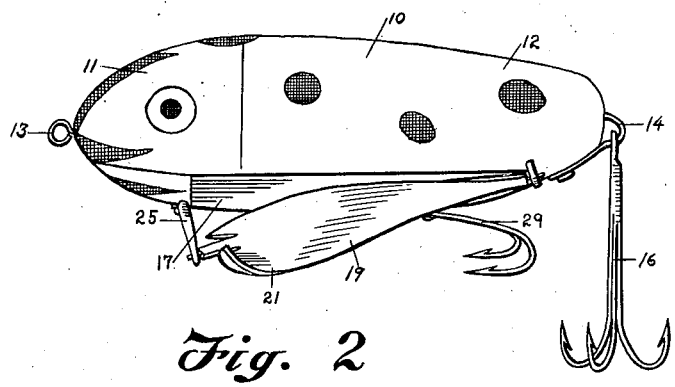
Figure 2:
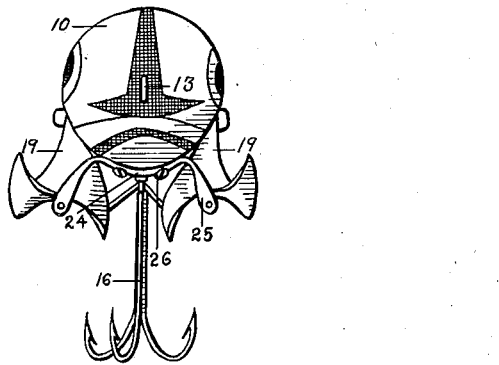
Fig. 2 is a front elevational view of the fishing lure.
Figure 3:
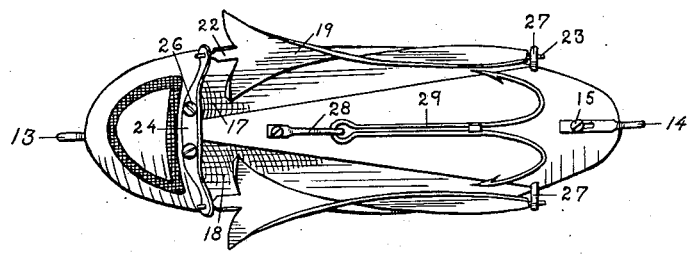
Fig. 3 is a bottom plan view of the fishing lure, with rear hook removed.

Referring now to the figures, 10 represents the main body of the lure which has an enlarged head portion 11 and a tail portion 12. On the head portion 11 is an eye 13 by which connection of the lure can be made with the line. On the rear portion 12 is a bent loop 14 connected therewith by means of a screw 15 to which a multiple pointed fish hook 16 is connected. The body 10 may be painted with any design or color that may be wanted.

The belly of the body 10 is grooved as indicated at 17 and 18 on the opposite sides of the same and within these grooves and extending below the same are forwardly and downwardly inclined spinners 19, one spinner being in and extending below each groove. The spinner 19 has a large forward or head end 21 and a rearwardly tapered portion extending from the head portion toward the rear of the body 10. The spinners 19 are made of twisted sheet metal of tapered configuration and have an axle portion 22 on its forward and an axle portion 23 on its rearward end. Connected to the head portion 11 and extending across the bottom of the same is a bracket 24 having openings at the opposite ends of the same to receive the axle portion 22 of the spinners and serving to maintain them in laterally spaced positions relative to one another and within the grooves and below the body. The ends of the bracket 24 extend downwardly and slightly rearwardly as indicated at 25. Screws 26 are used for connecting the bracket 24 to the body. Eyes 27 are disposed in the rear portion 12 of the body to retain the axle portion 23 of the spinners 19. The spinners are accordingly mounted to be forwardly and downwardly inclined.

On the bottom of the body 10 and between the spinners 19 there is connected a loop 28 to which is connected a multiple pointed hook 29 which will extend rearwardly under the body.

While detail changes may be made in my construction, it shall be understood that such changes shall be within the spirit and scope of the present invention as defined by the appended claim.

I claim:

A fishing lure comprising a body having a head portion and a rear portion, fish hooks connected to the body, and forwardly and downwardly inclined spinners connected to the opposite sides of the body for rotation as the body is pulled through the water, said body having longitudinally extending grooves within the belly or bottom of the same and at opposite sides thereof, said spinners respectively disposed so as to extend partly within the grooves of the body and said spinners having forwardly and rearwardly extending axle portions, and a single bracket connected to the bottom of the body at the forward ends of said grooves and extending transversely thereacross, said bracket having depending side ends adapted to receive the axle portions on the forward end of the spinners, and means disposed at the ends of the grooves on opposite sides of the body for connecting the rear axle portions of the spinners to the body for rotation relative thereto.

EDDIE E. NORDQUIST.

REFERENCES CITED

The following references are of record in the file of this patent:

UNITED STATES PATENTS

| Number | Name | Date |
|---|---|---|
| 358,471 | Nealy | Mar. 1, 1887 |
| 974,493 | Immell | Nov. 1, 1910 |
| 1,731,161 | Farley | Oct. 8, 1929 |
| 1,842,127 | Stickel et al. | Jan. 19, 1932 |